US012558956B2

(12) United States Patent
Roat et al.

(10) Patent No.: US 12,558,956 B2
(45) Date of Patent: Feb. 24, 2026

(54) VEHICLE DIFFERENTIAL DISCONNECT ASSEMBLY

(71) Applicant: Warn Automotive, LLC, Milwaukie, OR (US)

(72) Inventors: Joshua Taylor Roat, Portland, OR (US); Bryan Yoder, Corvallis, OR (US); Bryan M. Averill, Portland, OR (US)

(73) Assignee: WARN Automotive, LLC, Milwaukie, OR (US)

( * ) Notice: Subject to any disclaimer, the term of this patent is extended or adjusted under 35 U.S.C. 154(b) by 0 days.

(21) Appl. No.: 19/070,081

(22) Filed: Mar. 4, 2025

(65) Prior Publication Data

US 2025/0282217 A1 Sep. 11, 2025

Related U.S. Application Data

(60) Provisional application No. 63/562,840, filed on Mar. 8, 2024.

(51) Int. Cl.
*B60K 17/346* (2006.01)
*B60K 23/08* (2006.01)
*F16D 27/118* (2006.01)

(52) U.S. Cl.
CPC ........ *B60K 17/346* (2013.01); *B60K 23/0808* (2013.01); *F16D 27/118* (2013.01); *B60K 2023/0891* (2013.01)

(58) Field of Classification Search
CPC ...... B60K 2023/0841; B60K 2023/043; B60K 2023/046; F16H 48/30; F16H 48/24; F16D 27/118; F16D 2011/002; F16D 2011/008
See application file for complete search history.

(56) References Cited

U.S. PATENT DOCUMENTS

| | | | | | |
|---|---|---|---|---|---|
| 2,553,851 | A | * | 5/1951 | Drake | D03J 1/14 |
| | | | | | 28/186 |
| 4,271,722 | A | * | 6/1981 | Campbell | F16H 48/34 |
| | | | | | 475/86 |
| 8,382,633 | B2 | | 2/2013 | Cooper et al. | |
| 9,759,303 | B2 | | 9/2017 | Peura | |
| 10,221,900 | B2 | | 3/2019 | Heravi et al. | |

(Continued)

FOREIGN PATENT DOCUMENTS

| | | | | | |
|---|---|---|---|---|---|
| CN | 109072989 | A | * | 12/2018 | F16D 23/06 |
| FR | 3059741 | A1 | * | 6/2018 | F16D 11/14 |

*Primary Examiner* — Stacey A Fluhart
(74) *Attorney, Agent, or Firm* — Fish & Richardson P.C.

(57) ABSTRACT

A vehicle differential disconnect assembly includes a differential case and a differential gear set carried within the differential case. The differential gear set includes a differential carrier rotatably supported within the differential case. A clutch ring includes interior spline splines engaged with exterior splines of the differential case and being movable to engage exterior splines on the differential carrier. An actuator assembly includes a solenoid with a plunger that engages a rocker that is pivotally mounted to a support structure and connected to the plunger. A shift fork is operably engaged with the clutch ring and slidably mounted for translation along an axis. The shift fork includes an engagement feature for receiving an end of the rocker, wherein activation of the actuator causes pivotal movement of the rocker to cause the shift fork to translate along the axis.

10 Claims, 13 Drawing Sheets

(56) References Cited

U.S. PATENT DOCUMENTS

| | | | | |
|---|---|---|---|---|
| 10,724,580 | B2 | 7/2020 | Averill et al. | |
| 11,441,612 | B1 * | 9/2022 | Waltz | B60K 17/02 |
| 11,565,586 | B2 | 1/2023 | Verbridge et al. | |
| 11,766,943 | B2 | 9/2023 | Verbridge et al. | |
| 11,940,022 | B2 | 3/2024 | Verbridge et al. | |
| 12,012,998 | B2 * | 6/2024 | Jungwirth | F16D 11/14 |
| 2014/0378263 | A1 * | 12/2014 | Hayes | B60K 17/165 |
| | | | | 475/220 |
| 2022/0381340 | A1 * | 12/2022 | Pellmann | F16D 27/00 |
| 2023/0022383 | A1 | 1/2023 | Madineni | |
| 2023/0417310 | A1 * | 12/2023 | Verhoog | B60K 17/352 |
| 2024/0418251 | A1 * | 12/2024 | Lee | F16H 48/40 |

* cited by examiner

VEHICLE DIFFERENTIAL DISCONNECT ASSEMBLY

CROSS-REFERENCE TO RELATED APPLICATIONS

This application claims the benefit of U.S. Provisional Application No. 63/562,840, filed on Mar. 8, 2024. The entire disclosure of the above application is incorporated herein by reference.

FIELD

The present disclosure relates to a vehicle differential disconnect assembly.

BACKGROUND

This section provides background information related to the present disclosure which is not necessarily prior art.

Differential drives are generally known in the motor vehicle industry. Differential drives are used in conjunction with the transmission and drive shaft or propeller shaft (prop shaft) to turn the automotive vehicle wheels at different speeds when the vehicle is going around a curve, in order to differentiate the speed of each wheel individually, and to provide the proper amount of torque to each wheel in slipping, turning, or other road-to-wheel conditions.

In a traditional torque on demand drive train layout of an automotive vehicle there is a primary driven front/rear axle, and a secondary driven "hang on" axle that is connected via a prop shaft or drive shaft and a torque transfer coupling to the primary driven axle. The torque transfer coupling is usually directly in front of and upstream of the secondary driven axle. The axle differential creates the division of power (or torque) to each side shaft of the axle. The primary driven axle can also include a differential which divides necessary power to the side shaft of each front axle shaft and then the wheels. The division of torque between the front and rear axle is completed by the torque transfer coupling which is typically a separate unit on the drive train system and requires space for its housing and other related parts. In a known traditional configuration, a torque transfer coupling for an automotive vehicle is located between the primary and secondary driven axles of the vehicle and may include a friction clutch pack which is loaded via a ball ramp mechanism. The ball ramp mechanism may be engaged by an electric motor. An electronic control unit senses slip conditions of the wheels, monitors current driving conditions of the vehicle and applies a current to the electric motor which will engage the clutch via the ball ramp mechanism and distribute torque to each wheel, as necessary.

SUMMARY

This section provides a general summary of the disclosure, and is not a comprehensive disclosure of its full scope or all of its features.

According to an aspect of the present disclosure, a vehicle differential disconnect assembly includes a differential case and a differential gear set carried within the differential case. The differential gear set includes a differential carrier rotatably supported within the differential case and supporting a bearing pin that supports a pair of bevel gears in meshing engagement with a pair of side shaft gears. A clutch ring includes a first set of splines engaged with a second set of splines of the differential case and being movable to engage a third set of splines on the differential carrier. An actuator assembly that engages a rocker that is pivotally mounted to a support structure and connected to the plunger. A shift fork is directly or indirectly engaged with the clutch ring and slidably mounted for translation along an axis. The shift fork includes an engagement feature for receiving an end of the rocker, wherein activation of the actuator causes pivotal movement of the rocker to cause the shift fork to translate along the axis.

A clutch ring mount can be utilized to engage the shift fork to the clutch ring. The clutch ring mount can include an annular ring portion with an exterior groove and a plurality of arms that engage the clutch ring through windows in the differential housing, According to a further aspect, the first set of splines on the clutch ring that engage the second set of splines on the differential case include exterior splines and the first set of splines on the clutch ring that engage the third set of splines on the differential carrier include interior splines.

According to a further aspect, the first set of splines on the clutch ring that engage second set of splines on the differential case include interior splines and the first set of splines on the clutch ring that engage the third set of splines on the differential carrier include interior splines.

According to a further aspect, the actuator assembly further comprises a solenoid with a plunger.

According to a further aspect, the actuator assembly includes one of a bi-stable actuator assembly and a mono-stable actuator assembly.

According to a further aspect, the first set of splines of the clutch ring include a plurality of stepped splines including a slider spline portion engaged with the second set of splines of the of the differential case and the plurality of stepped splines including a coupler spline portion being movable to engage the second set of splines on the second rotatable member, wherein the slider spline portion being configured to have less backlash with the first set of exterior splines than a backlash between the coupler spline portion and the second set of exterior splines.

According to a further aspect, the actuator includes at least one electric coil, a core movable relative to the electric coil and a plunger attached to the core and to the rocker, a pair of longitudinally spaced recesses associated with one of the core and the plunger and configured to be engaged by a spring detent mechanism.

According to an aspect of the present disclosure, a clutch engagement assembly includes a first rotatable member having a first set of exterior splines. A second rotatable member has a second set of exterior splines adjacent to the first set of exterior splines. A clutch ring includes a plurality of stepped interior splines including a slider spline portion engaged with the first set of splines of the first rotatable member and the stepped interior splines including a coupler spline portion being movable to engage the second set of splines on the second rotatable member, wherein the slider spline portion is configured to have less backlash with the first set of exterior splines than a backlash between the coupler spline portion and the second set of exterior splines. An actuator assembly is engaged with the clutch ring and operable to move the coupler spline portion of the clutch ring between an engaged and a disengaged position with the second set of splines.

According to a further aspect, the slider spline portion includes interior splines on the clutch ring and the slider spline portion has a smaller pitch diameter than the coupler spline portion.

According to a further aspect, the slider spline portion includes one of a different size and shape than the coupler spline portion.

According to an aspect of the present disclosure, a clutch engagement assembly includes a first rotatable member having a first set of exterior splines. A second rotatable member has a second set of exterior splines adjacent to the first set of exterior splines. A clutch ring includes a plurality of stepped interior splines including a slider spline portion engaged with the first set of splines of the first rotatable member and the stepped interior splines including a coupler spline portion being movable to engage the second set of splines on the second rotatable member. The slider spline portion is configured to have less backlash with the first set of exterior splines than a backlash between the coupler spline portion and the second set of exterior splines. A solenoid actuator assembly is engaged with the clutch ring and operable to move the clutch ring between an engaged and a disengaged position with the second set of splines. The solenoid actuator assembly includes at least one electric coil, a core movable relative to the electric coil and a plunger attached to the core and to a shift mechanism that engages the clutch ring. A pair of longitudinally spaced recesses are associated with one of the core and the plunger and configured to be engaged by a spring detent mechanism.

According to a further aspect, the pair of longitudinally spaced recesses are disposed directly on the core.

According to a further aspect, the pair of longitudinally spaced recesses are disposed on a catch mounted to the plunger.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
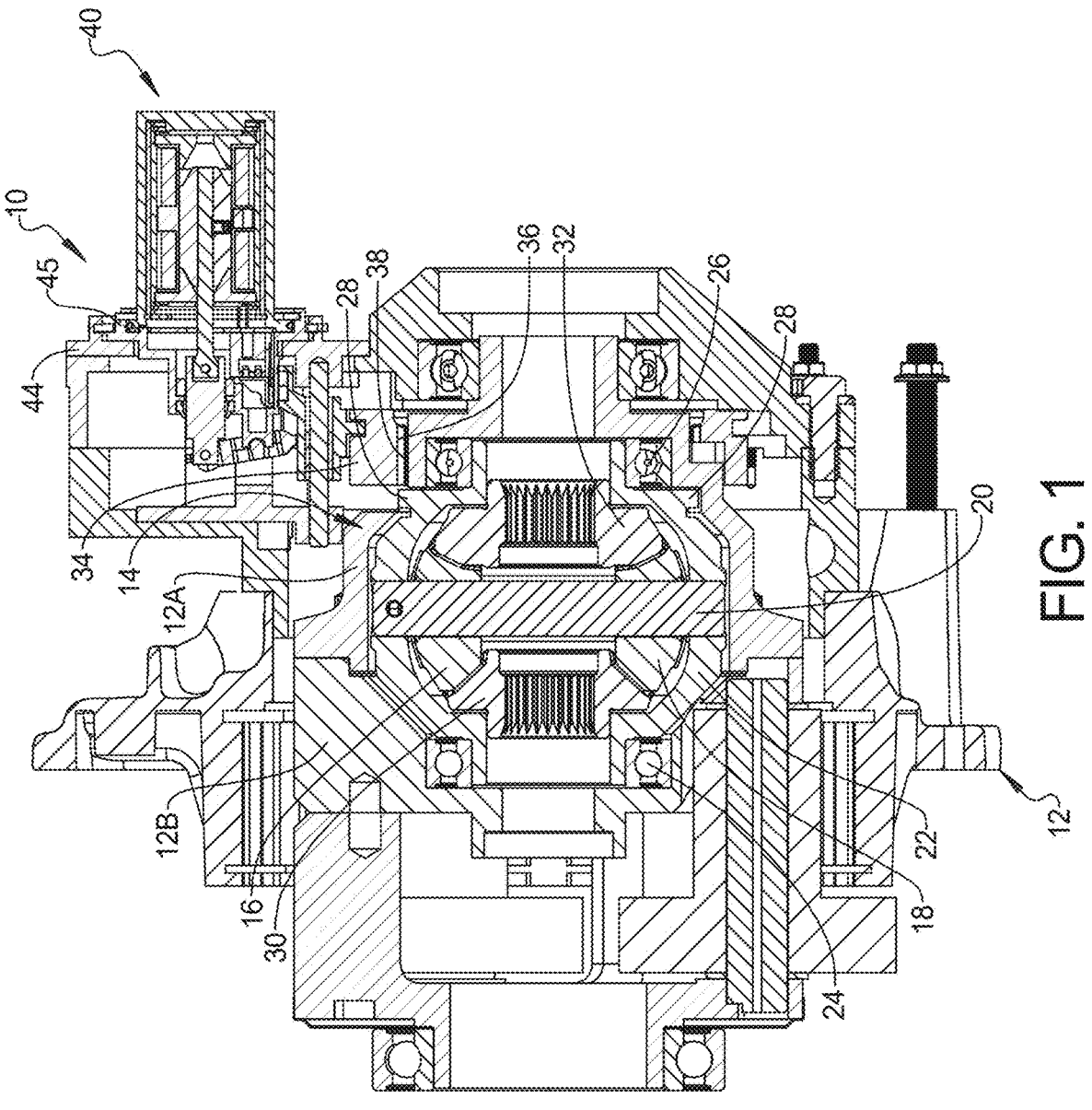
FIG. 1 is a cross-sectional view of a vehicle differential having a disconnect assembly according to the principles of the present disclosure.

With reference to FIG. 1 a differential disconnect assembly 10 is shown including a differential case 12. A differential gear set 14 is disposed within the differential case 12. The differential gearset 14 includes two differential bevel gears 16, 18 that are rotatably arranged on a bearing pin 20 that forms a rotational axis for the differential bevel gears 16, 18. A carrier 22 supports the bearing pin 20. The carrier 22 is rotatably supported within the case 12 by a pair of bearing assemblies 24, 26. The carrier 22 includes a plurality of exterior splines 28. First and second differential side shaft gears 30, 32 are in meshing engagement with the bevel gears 16, 18. A rotational axis of the side shaft gears 30, 32 intersect the rotational axis of the bevel gears 16, 18. The differential case 12 can include a differential carrier housing portion 12A and a planetary gear housing portion 12B that allow for the assembly of the carrier 22 therein.

Figure 3:
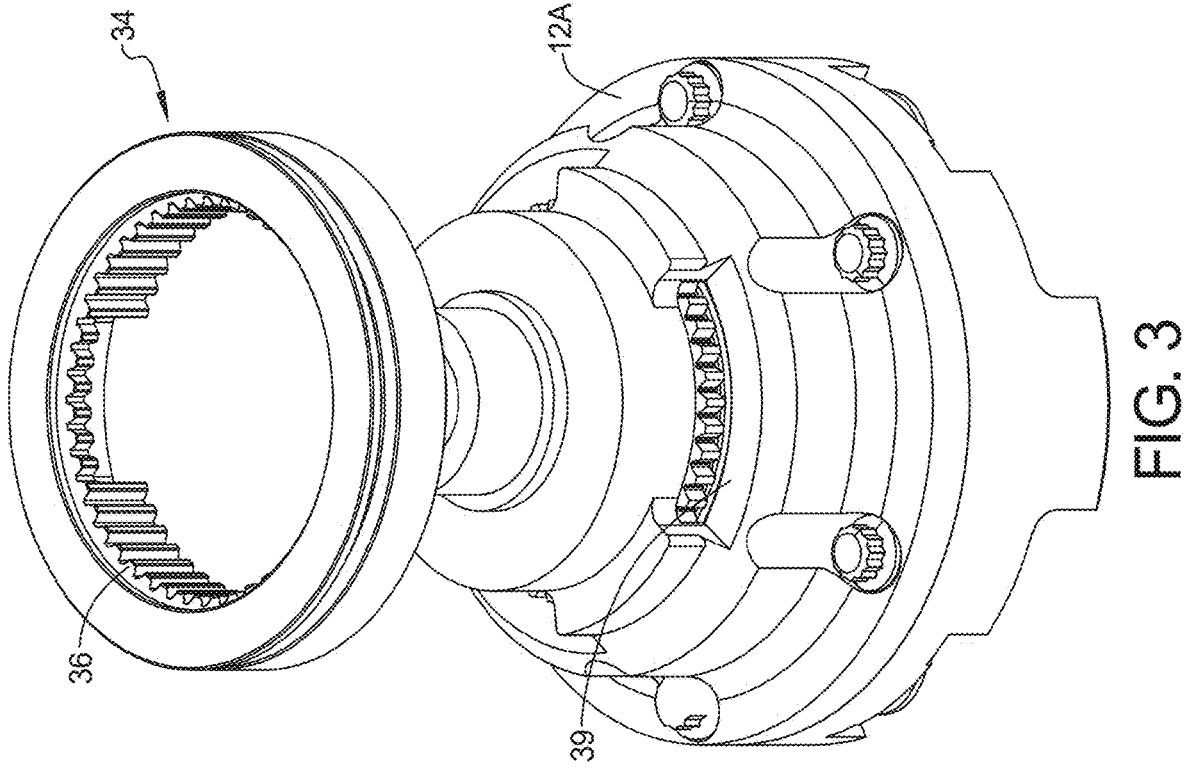
FIG. 3 is an exploded perspective view of the clutch ring and the differential carrier housing portion of the differential case.

A clutch ring 34 has interior splines 36 that engage exterior splines 38 on the differential case 12. The clutch ring 34 is axially movable into and out of engagement with the exterior splines 28 of the carrier 22 in order to rotatably engage or disengage the carrier 22 to the differential case 12. With reference to FIG. 3, the differential carrier housing portion 12A can include a plurality of engagement windows 39 that expose the exterior splines 38 on the differential case 12. With continued reference to FIG. 3, the interior splines 36 of the clutch ring 34 can be extended in the location of the engagement windows and truncated where there are no engagement windows 39. The engagement windows 39 (three are shown, but more or less can be utilized) provide an engagement interface with the differential carrier housing portion 12A. The recessed window cutouts 39 provide optimal strength and integrity to the system as opposed to passing all the way through. An actuator assembly 40 is operable to axially move a shift fork 42 that engages the clutch ring 34.

Figure 2:
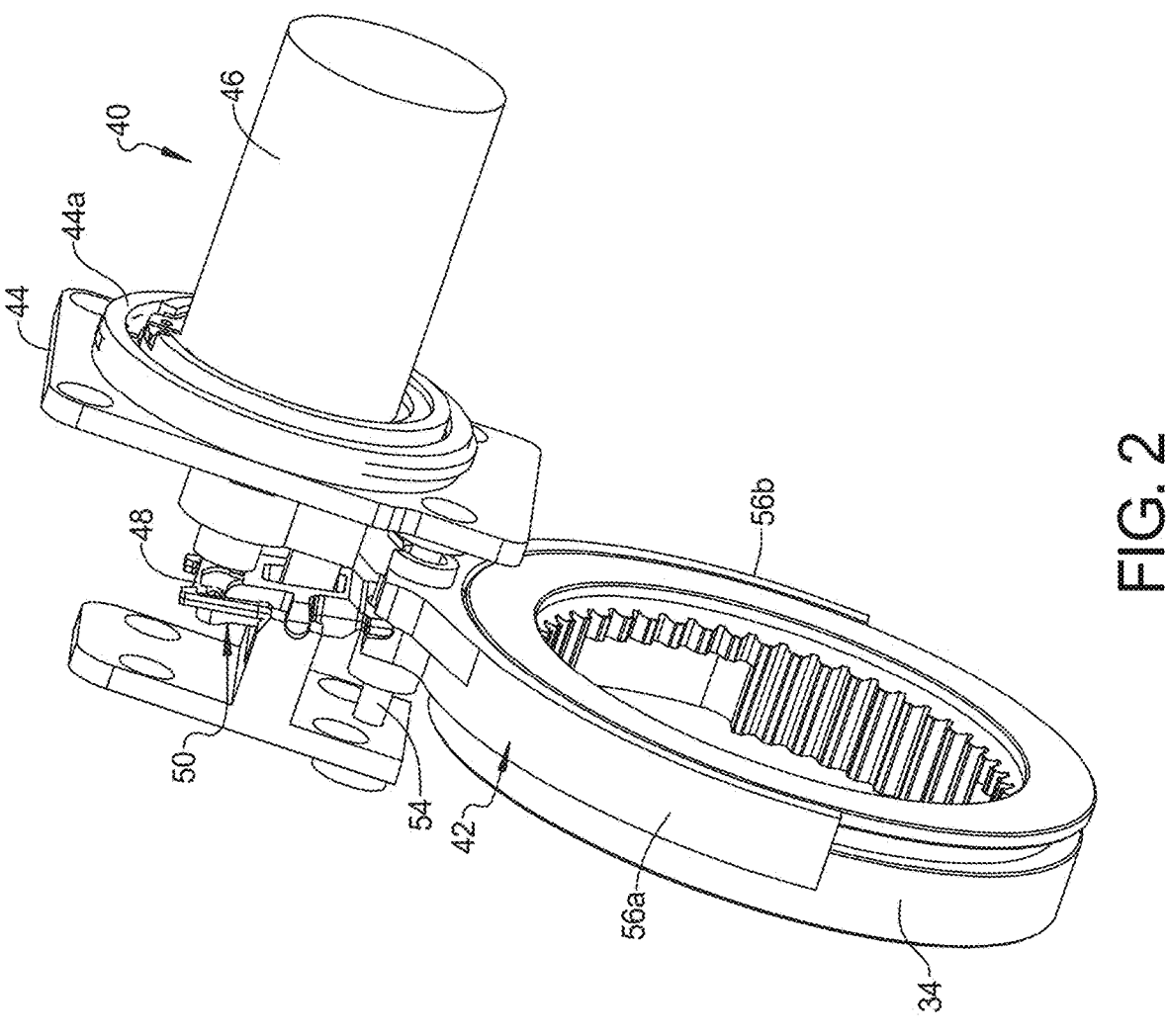
FIG. 2 is a perspective view of the actuator assembly according to the principles of the present disclosure.
Figure 4:
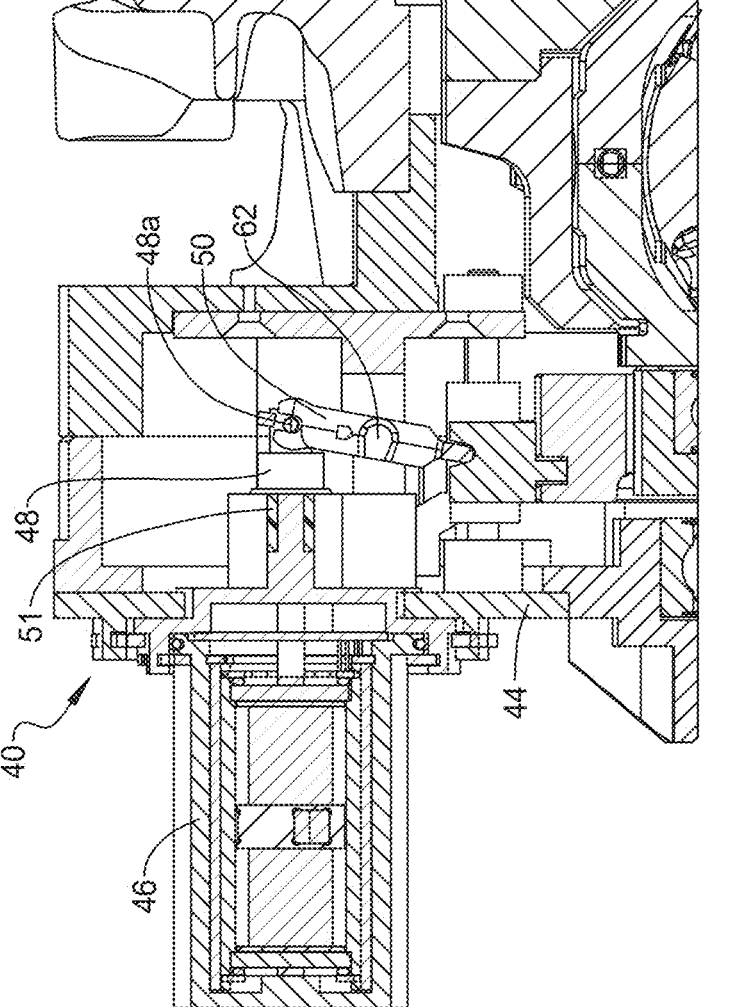
FIG. 4 is a cross-sectional view of the actuator assembly according to the principles of the present disclosure.

The actuator assembly 40 includes a mounting bracket (or other support structure) 44 that can be mounted to the differential case 12. A gasket or seal can be provided between the mounting bracket 44 and the differential case 12. The mounting bracket 44 can include a recessed groove for receiving the gasket. The mounting bracket 44 can be made from aluminum and includes a solenoid portion 44a for mounting a solenoid 46. The solenoid 46 includes a plunger 48 that engages a rocker 50. The actuator does not need to include a solenoid and can include a vacuum actuator, a cam actuator, a motor-driven actuator, a pneumatic actuator, a hydraulic actuator, or any other actuator that would be known in the art. As shown in FIG. 2, the rocker 50 is pivotally mounted to the mounting bracket or other support structure 44 and is engaged with the shift fork 42. The actuator assembly 40 may be reoriented at any angle in relation to the central axis of clutch ring 34 travel. The actuator assembly 40 may also be offset laterally from the axis of clutch ring 34 travel or rotated circumferentially around the axis of clutch ring 34 travel. The actuator assembly 40 is partially submerged in oil which reduces noise, vibration and harshness. As shown in FIG. 4, an oil seal 51 can engage the plunger 48. Not pictured, the actuator assembly 40 may be positioned directly in line with the axis of clutch ring 34 travel, eliminating the need for the shift fork 42 and rocker 50. In this embodiment, the clutch ring 34 is actuated by a series of push pins (not pictured) coupled directly to the clutch ring.

Figure 5:
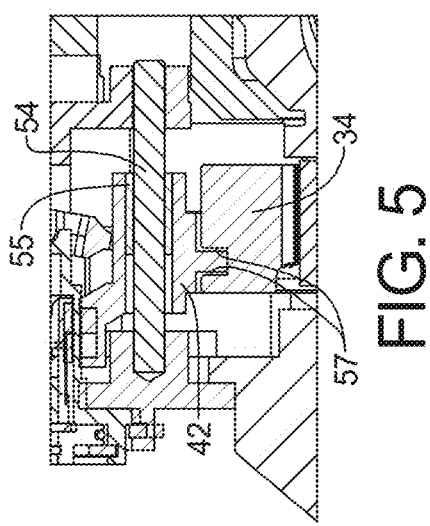
FIG. 5 is a detailed cross-sectional view of the shift fork and clutch ring.

With reference to FIGS. 1 and 2, the shift fork 42 is slidably supported on an elongated translation pin 54 extending from a lower portion 44b of the mounting bracket 44. The pin 54 ensures the rotational rocker movement is properly converted to linear movement only when force is transferred to the shift fork 42. As shown in FIG. 5, the shift fork 42 includes a bushing 55 that slides along the translation pin 54. The bushing 55 can be made from VESPEL or other low friction material. The elongated translation pin 54 can extend parallel to an axis of rotation of the side shaft gears 30, 32. When the solenoid 46 is actuated, the plunger 48 moves in fore and aft directions and pivots the rocker 50 to cause the shift fork 42 to translate along the translation pin 54. As best shown in FIG. 2, the shift fork 42 includes a pair of arms 56a, 56b that engage with the clutch ring 34 to move the clutch ring 34 from an engaged to a disengaged position and vice versa. As shown in FIG. 5, the shift fork 42 can include wear pads 57 for engaging the clutch ring 34. The wear pads 57 can be made from VESPEL or other low friction material.

Figure 6:
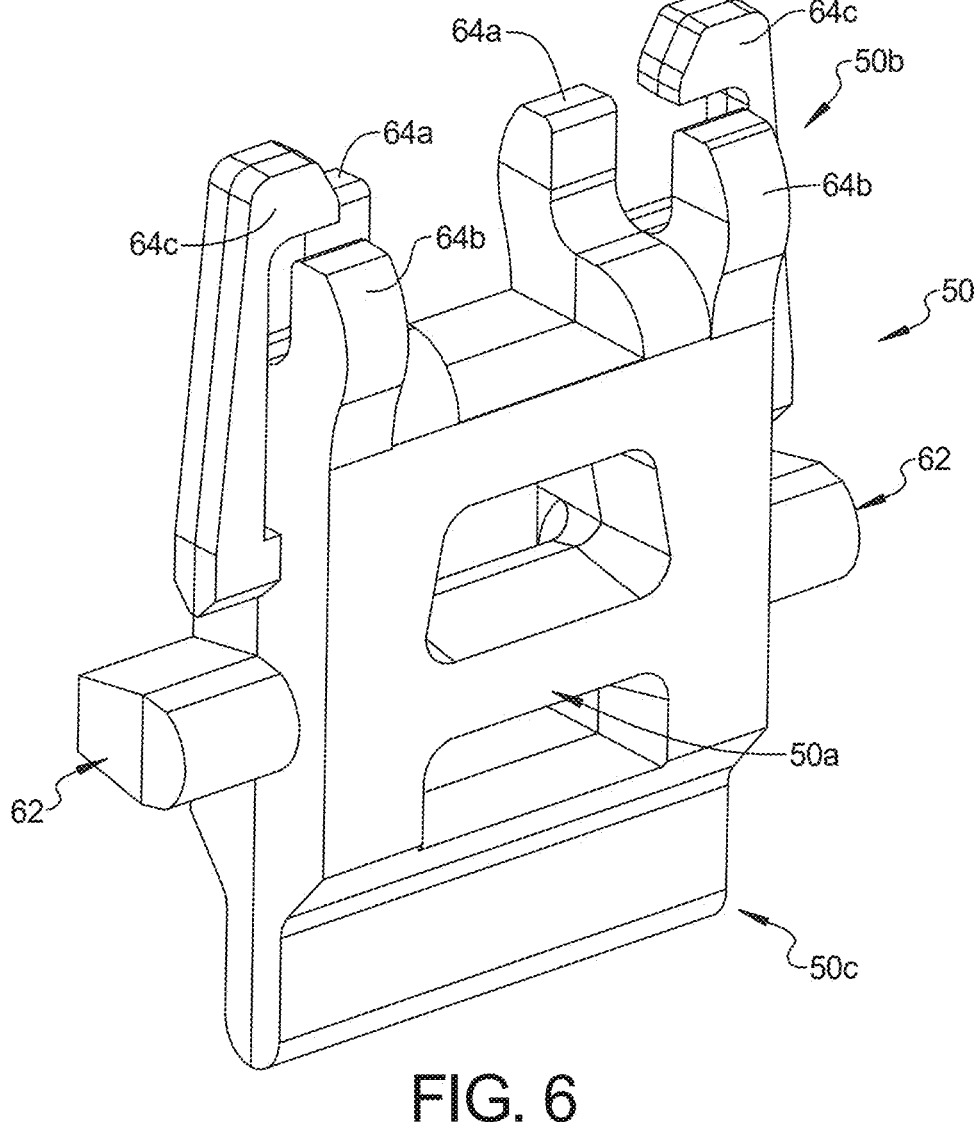
FIG. 6 is a perspective view of the rocker according to the principles of the present disclosure.

With reference to FIG. 6, the rocker 50 can be made from plastic or metal and can include a pair of integral pivot arms 62 extending from a mid-portion 50a of the rocker 50. An upper end 50b of the rocker 50 includes snap engagement members 64a, 64b for engagement with a cross pin 48a of the plunger 48. As shown in FIG. 6, a pair of optional latches 64c are provided for engaging a top end of the cross pin 48a of the plunger 48. The pair of latches 64c have a tapered inner face to facilitate insertion of the cross pin 48a. The pair of latches 64c can flex laterally outward when the cross pin is inserted and snap back to secure the cross pin in place. A lower end 50c of the rocker 50 includes a rounded interface for engagement with a V-shaped channel 66 in an upper surface of the shift fork 42.

Accordingly, in operation, the rocker 50 is pivotally mounted to the mounting bracket 44 and the cross pin 48a of the plunger 48 of the solenoid 46 is connected to the snap engagement members 64a, 64b for allowing the solenoid to move the rocker 50 in a pivoting motion. As the rocker 50 is pivoted, the lower end 50c of the rocker 50 moves the shift fork 42 linearly along the translation pin 54. When the plunger 48 is retracted, the shift fork 42 is extended into engagement with the exterior splines 28 of the carrier 22 and when the plunger 48 is extended, the shift fork 52 is retracted out of engagement with the exterior splines 28 of the carrier 22. The linear movement of the shift fork 42 creates a more durable design and requires less space and less material as compared to a pivoting shift fork design. The rocker 50 allows for an optimal design fit to the differential 10 as well as an easy customizable rocker profile.

The design also positions the line of force between the rocker 50 and the shift fork 42 very close to the shift fork translation pin 54, thereby eliminating translation stiction. The use of the rocker 50 may be applicable to other disconnects.

The solenoid 46 can be "bi-stable" with a magnetic latching mechanism so that current is not needed when the solenoid is extended or retracted. However, a mono-stable solenoid may also be used.

Figure 7:
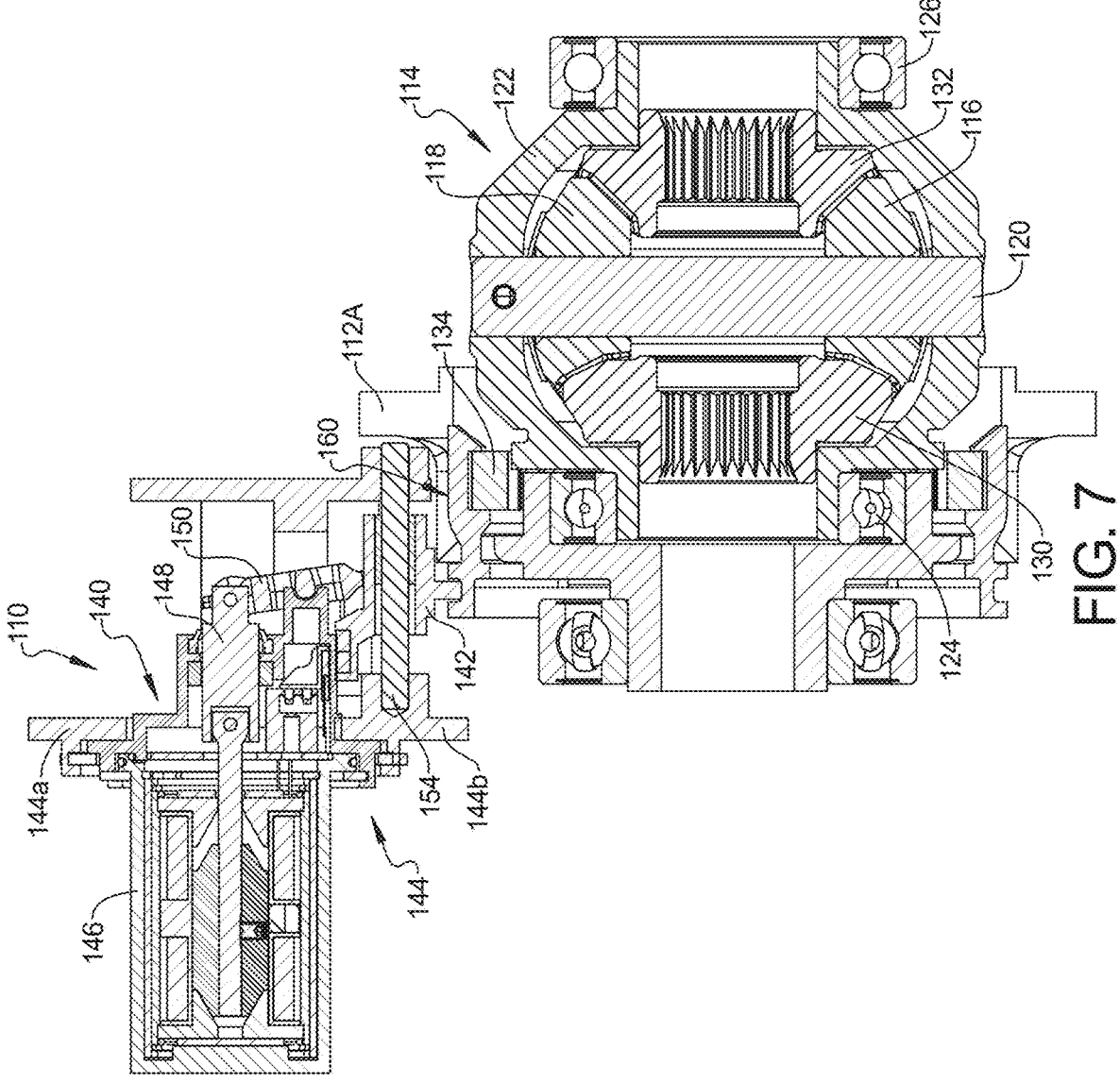
FIG. 7 is a cross-sectional view of an alternative vehicle differential having a disconnect assembly shown in a connected state according to the principles of the present disclosure.
Figure 8:
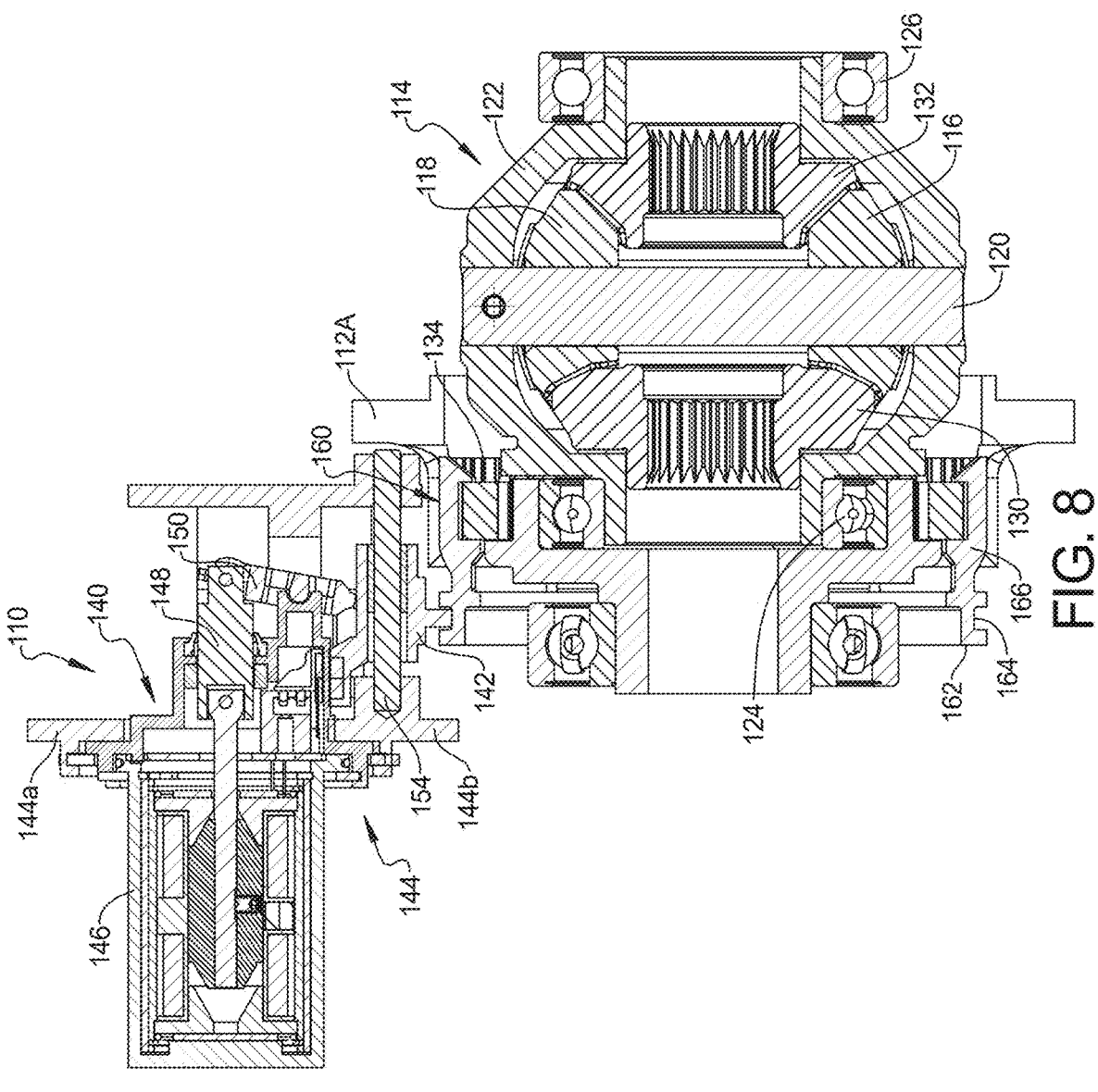
FIG. 8 is a cross-sectional view of the alternative vehicle differential having a disconnect assembly shown in a disconnected state according to the principles of the present disclosure.

With reference to FIGS. 7 and 8, a differential disconnect assembly 110 is shown connected to a differential case 112 (partially shown in FIGS. 7 and 8). A differential gear set 114 is disposed within the differential case 112. The differential gearset 114 includes two differential bevel gears 116, 118 that are rotatably arranged on a bearing pin 120 that forms a rotational axis for the differential bevel gears 116, 118. A carrier 122 supports the bearing pin 120. The carrier 122 is rotatably supported within the case 112 by a pair of bearing assemblies 124, 126. The carrier 122 includes a plurality of exterior splines 128. First and second differential side shaft gears 130, 132 are in meshing engagement with the bevel gears 116, 118. A rotational axis of the side shaft gears 130, 132 intersect the rotational axis of the bevel gears 116, 118. The differential case 112 can include a differential carrier housing portion 112A and a planetary gear housing portion (shown in FIG. 1) that allow for the assembly of the carrier 122 therein.

Figure 9:
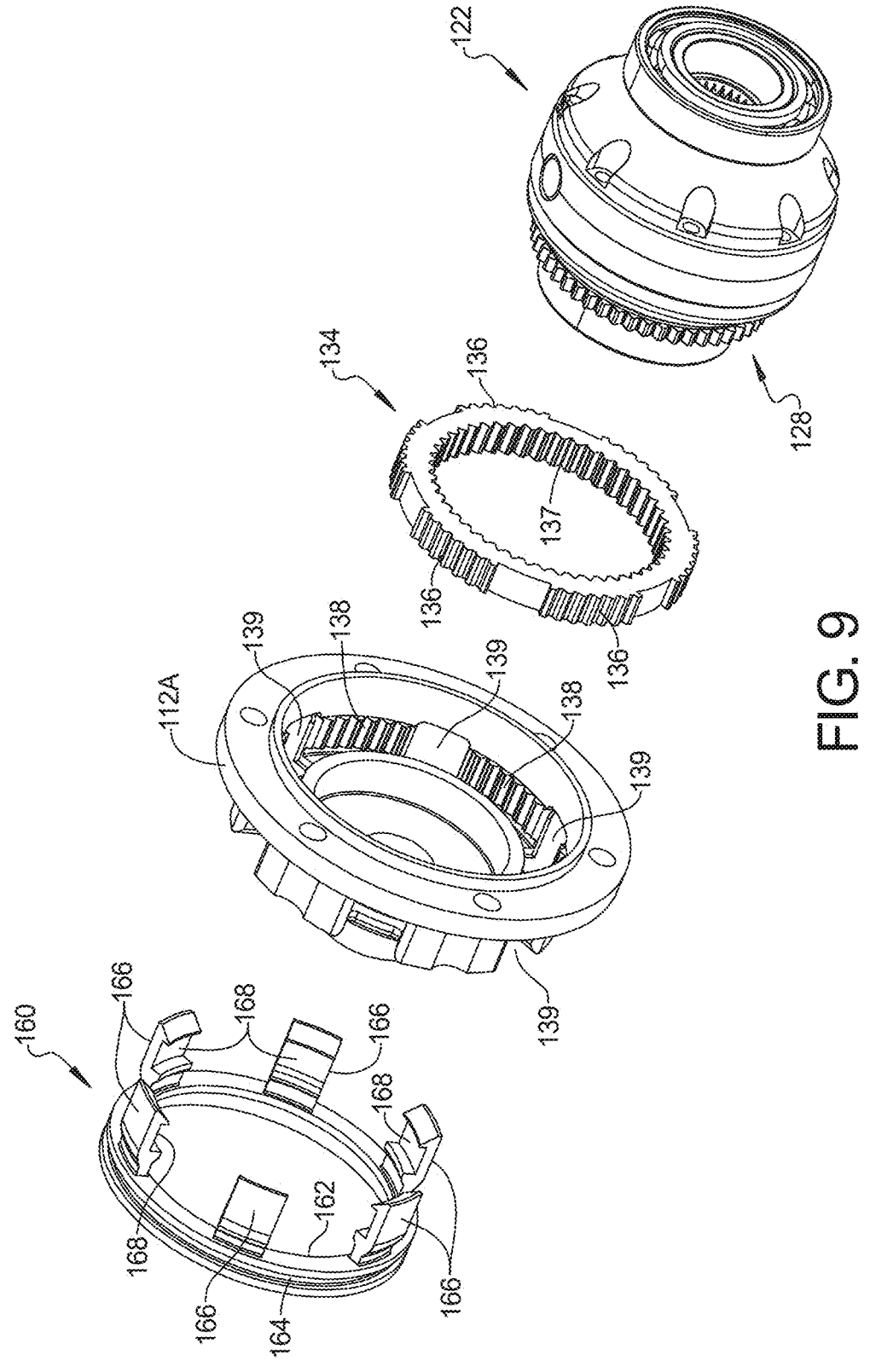
FIG. 9 is an exploded perspective view of the alternative vehicle differential having a clutch ring mount according to the principles of the present disclosure.
Figure 10:
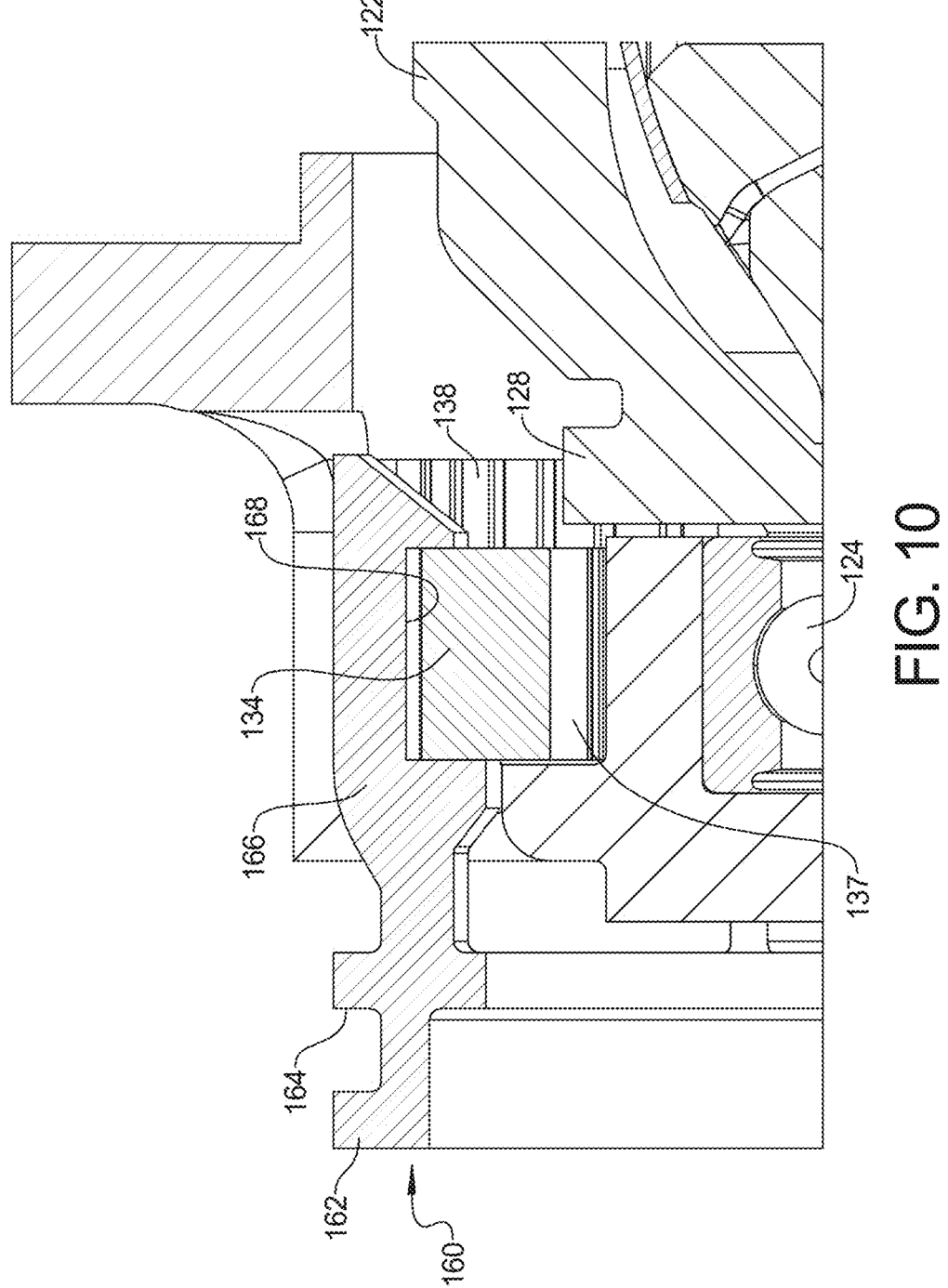
FIG. 10 is a detailed cross-sectional view of the clutch ring mount engaged with the clutch ring.

With reference to FIG. 9, a clutch ring 134 has exterior splines 136 that engage interior splines 138 on the differential case 112A. The clutch ring 134 has interior splines 137 that are axially movable into and out of engagement with the exterior splines 128 of the carrier 122 in order to rotatably engage or disengage the carrier 122 to the differential case 112A. With reference to FIG. 9, the differential carrier housing portion 112A can include a plurality of engagement windows 139 that expose the clutch ring 134. With continued reference to FIG. 9, the exterior splines 136 of the clutch ring 134 can be interrupted in the location of the engagement windows 139. A clutch ring mount 160 includes an annular ring portion 162 with an exterior groove 164. A plurality of arms 166 extend axially from the annular ring portion 162 and include an interior groove 168 that engage the clutch ring 134. The clutch ring mount 160 can be made from plastic or other material that allow the arms 166 to flex for snap engagement of the grooves 168 with the clutch ring 134 The engagement windows 139 (six are shown, but more or less can be utilized) provide an engagement interface for each of the plurality of arms 166 to engage the clutch ring within the differential case 112. As shown in FIGS. 7 and 8, an actuator assembly 140 is operable to axially move a shift fork 142 that engages the clutch ring mount 160 that in turn moves the clutch ring 134.

The clutch ring mount 160 allows the actuator assembly 140 to be mounted at an alternative location for easier packaging of the actuator assembly 140. The actuator assembly 140 includes a mounting bracket (or other support structure) 144 that can be mounted near the differential case 112. The mounting bracket 144 can be made from aluminum and includes a solenoid portion 144a for mounting a solenoid 146. The solenoid 146 includes a plunger 148 that engages a rocker 150. The actuator does not need to include a solenoid and can include a vacuum actuator, a cam or other actuator. As shown in FIGS. 7 and 8, the rocker 150 is pivotally mounted to the mounting bracket 144 or other support structure 144 and is engaged with the shift fork 142. The rocker 150 can take on various forms.

With reference to FIGS. 7 and 8, the shift fork 142 is slidably supported on an elongated translation pin 154 extending from a lower portion 144b of the mounting bracket 144. The translation pin 154 ensures the rotational rocker movement is properly converted to linear movement only when force is transferred to the shift fork 142. The elongated translation pin 154 can extend parallel to an axis of rotation of the side shaft gears 130, 132. When the solenoid 146 is actuated, the plunger 148 moves in fore and aft directions and pivots the rocker 150 to cause the shift fork 142 to translate along the translation pin 154. As best shown in FIGS. 7 and 8, the shift fork 142 includes a pair of arms 56a, 56b that engage with the clutch ring mount 160 to move the clutch ring 134 from an engaged position (FIG. 7) to a disengaged position (FIG. 8) and vice versa.

The clutch ring mount 160 allows the clutch ring 134 to be more easily machined. The clutch ring mount 160 can be made from plastic and is easy to form. The design allows the torque to be distributed across more splines which makes for a more robust design. The clutch ring mount 160 also reduces backlash and provides improved noise, vibration and harshness.

Figure 11:
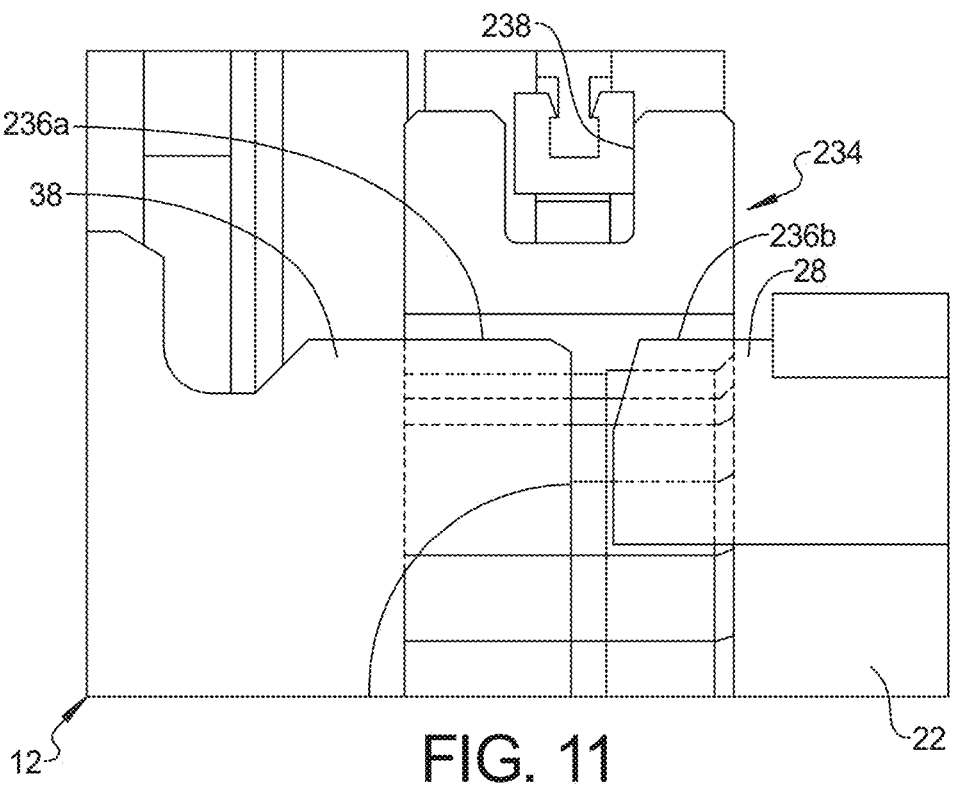
FIG. 11 is a cross-sectional view of a clutch ring having slider splines engaging exterior splines of the case and coupler splines engaging the exterior splines of the carrier.
Figure 12:
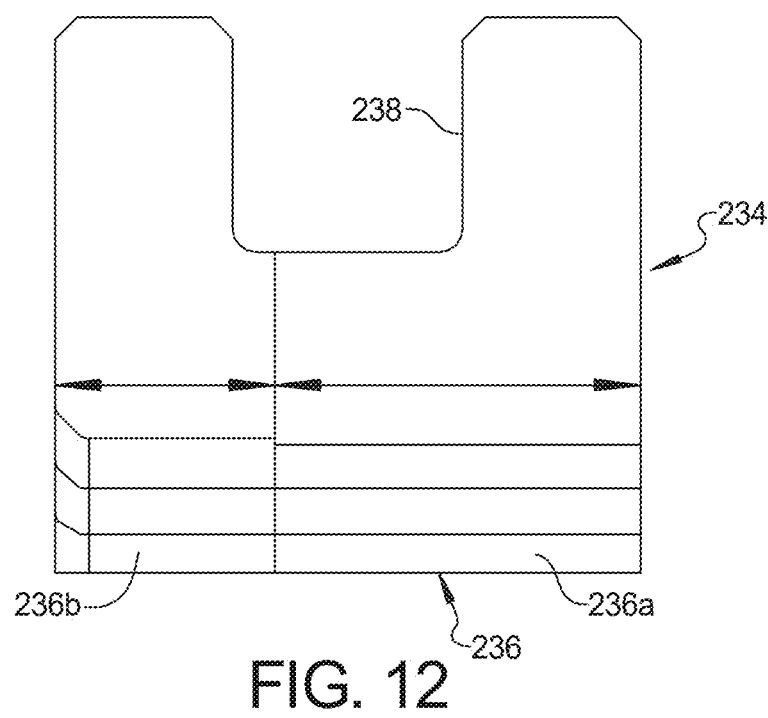
FIG. 12 is a detailed cross-sectional view of a clutch ring having slider splines and coupler splines according to the principles of the present disclosure.

With reference to FIGS. 11 and 12 a clutch ring 234 having stepped splines 236 including slider spline portions 236a engaging exterior splines 238 of an axle 212 and coupler spline portions 236b engaging the exterior splines 228 of a wheel bearing coupler 222. Many applications require an actuator to have minimal NVH when shifting. These requirements make it difficult to tune the backlash between the coupler splines and the axle splines with a common clutch ring spline size. Typically the interface between the clutch ring and the coupling splines on the wheel hub requires much more backlash than the sliding splines on the axle. Accordingly, the stepped splines 236 including slider spline portions 236a engaging exterior splines 238 of the axle 212 and coupler spline portions 236b engaging the exterior splines 228 of the wheel bearing coupler 222 reduces the systems overall backlash to a minimum. The slider spline portions 236a are aligned with the coupler spline portions 236b such that the number of slider spline portions 236a and the coupler spline portions are the same, but the shape of the slider spline portions 236a are different than the coupler spline portions 236b with the slider spline portions 236a having a larger tooth thickness than the coupler spline portions 236b. (The larger tooth thickness of 236a results in a tighter fit with the mating spline 38. The tighter fit results in les backlash) The coupler spline portion 236b has a smaller tooth thickness resulting in more backlash with coupler spline 228. Additionally spline 236a and 236b will have but not limited to the same pitch diameter. The slider spline portions 236a can have a wider dimension that the coupler spline portions 236b in an axial direction. The slider spline portions are configured to have a reduced backlash with the exterior splines 238 of the axle 212 than the coupler spline portions 236b have with the exterior splines 228 of the wheel bearing coupler 222.

Figure 13:
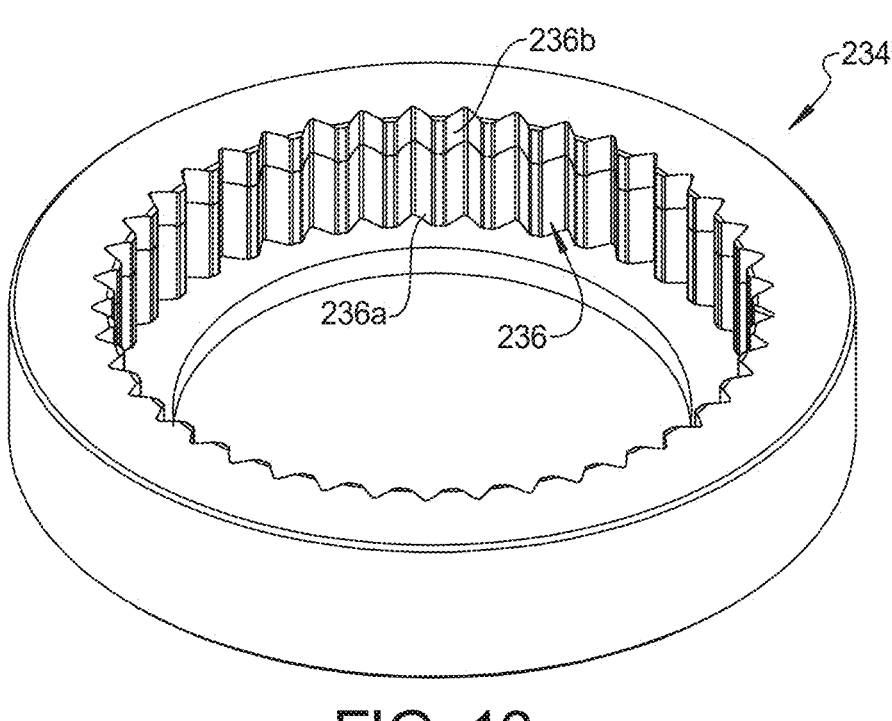
FIG. 13 is a perspective view of a net forged clutch ring having slider splines and coupler splines according to the principles of the present disclosure.
Figure 14:
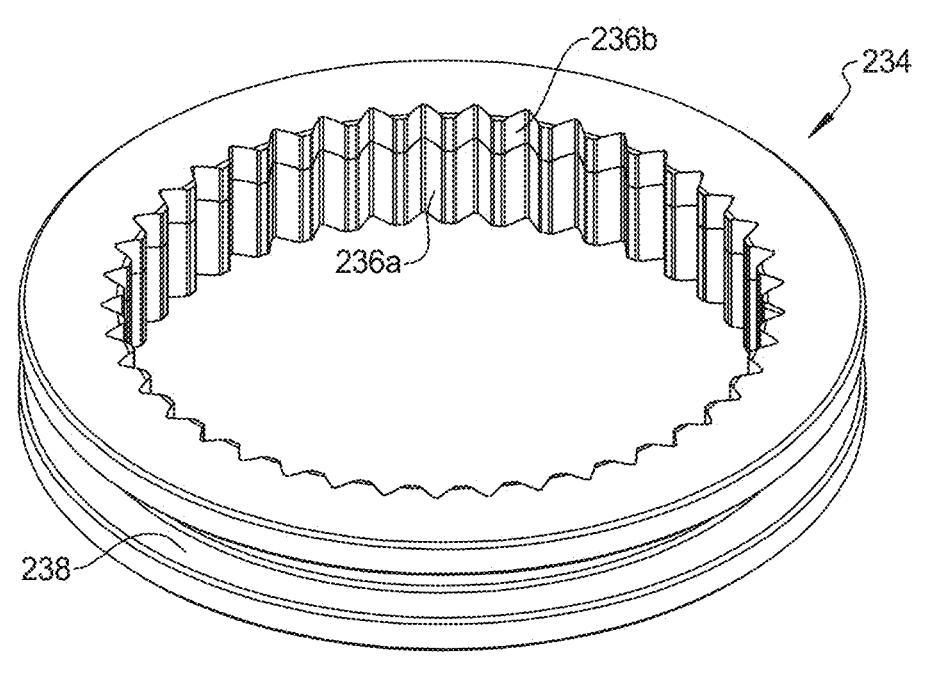
FIG. 14 is a perspective view of a machined clutch ring having slider splines and coupler splines according to the principles of the present disclosure.

As shown in FIG. 13, a net forged clutch ring 234' with net-forged splines allows for the stepped splines 236 having two different spline portions 236a, 236b having different shapes/sizes. As shown in FIG. 13, the inner slider spline portions 236a have a tighter space width of the external coupler spline portions 236b. The coupler spline portions 236b can have a pointed and blended tooth end detail. FIG. 14 shows a perspective view of the clutch ring 234 that has been machined at the outer diameter from the net-forged clutch ring of FIG. 13 to provide an outer annular groove 238 and to remove excess material from the net forged clutch ring.

Figure 15:
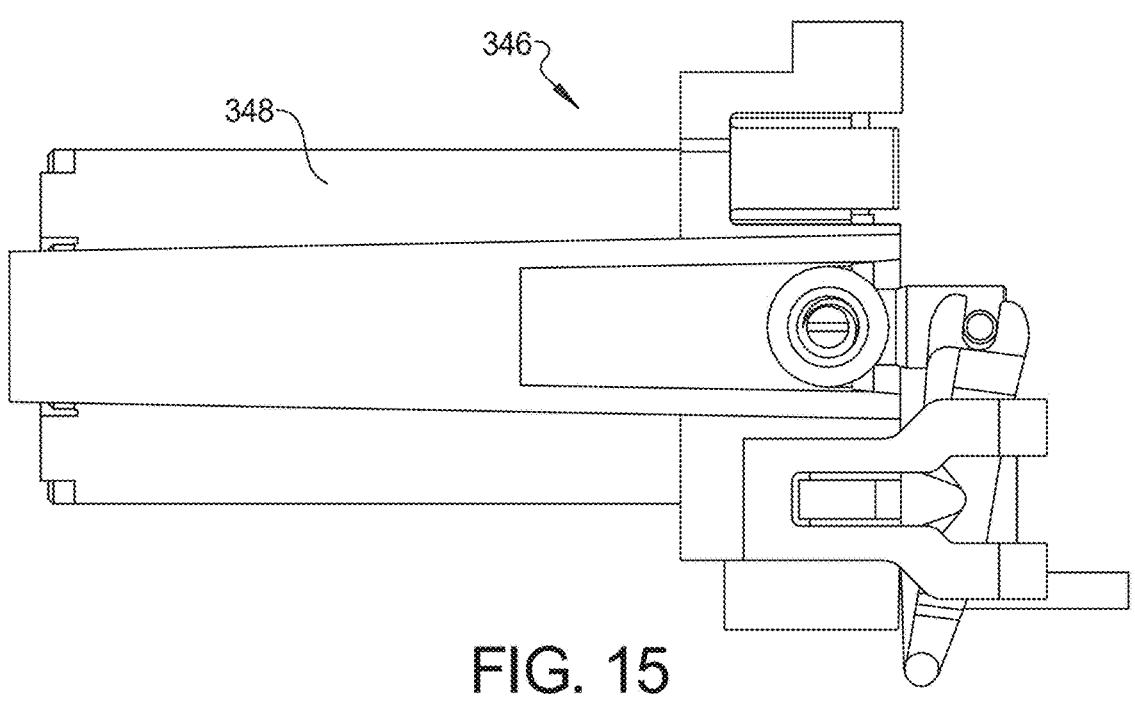
FIG. 15 is a plan view of a mechanically latched solenoid according to the principles of the present disclosure.
Figure 16:
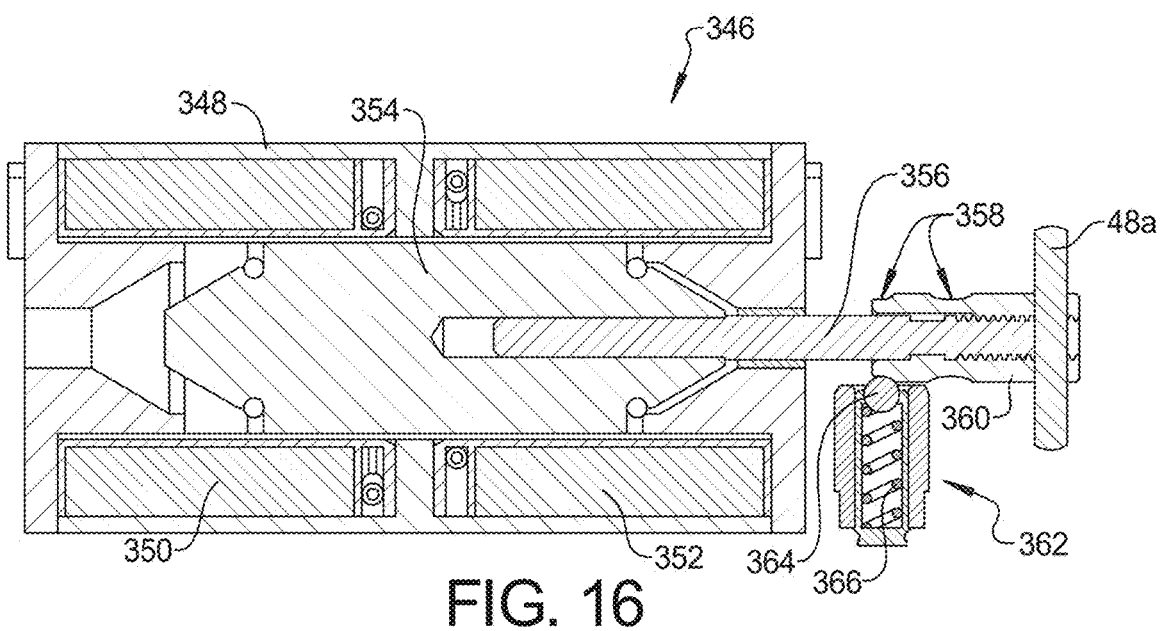
FIG. 16 is a cross sectional view of the mechanically latched solenoid latched in an extended position according to the principles of the present disclosure.
Figure 17:
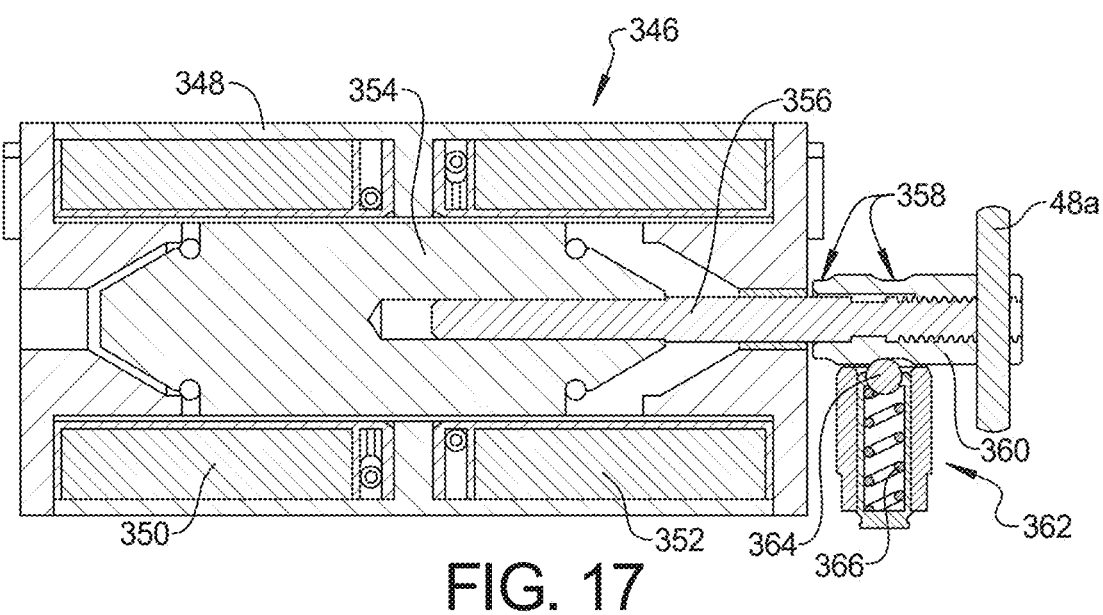
FIG. 17 is a cross sectional view of the mechanically latched solenoid latched in a retracted position according to the principles of the present disclosure.

With reference to FIGS. 15-17, a mechanically latched solenoid assembly 346 is shown according to an optional embodiment of the present disclosure. The mechanically latched solenoid assembly 346 includes a solenoid housing 348 supporting first and second fixed coils 350, 352 and a movable core 354. A plunger 356 is attached to the core 354. The plunger 356 includes a pair of longitudinally spaced recesses 358 that can be formed directly on the plunger or on a catch 360 that is mounted to the plunger 356. The catch 360 can be threadedly connected to the plunger and can support a pin 48a that is connected to the rocker 50 as disclosed herein. A ball detent 362 is supported by the solenoid mount and has a ball 364 that is biased by a spring into engagement with the recesses 358 of the plunger 356. The solenoid 346 can be actuated in an extended or a retracted direction and the ball detent engages either a forward or rearward one of the recesses 358 to latch the plunger 356 in the extended or retracted position.

Figure 18:
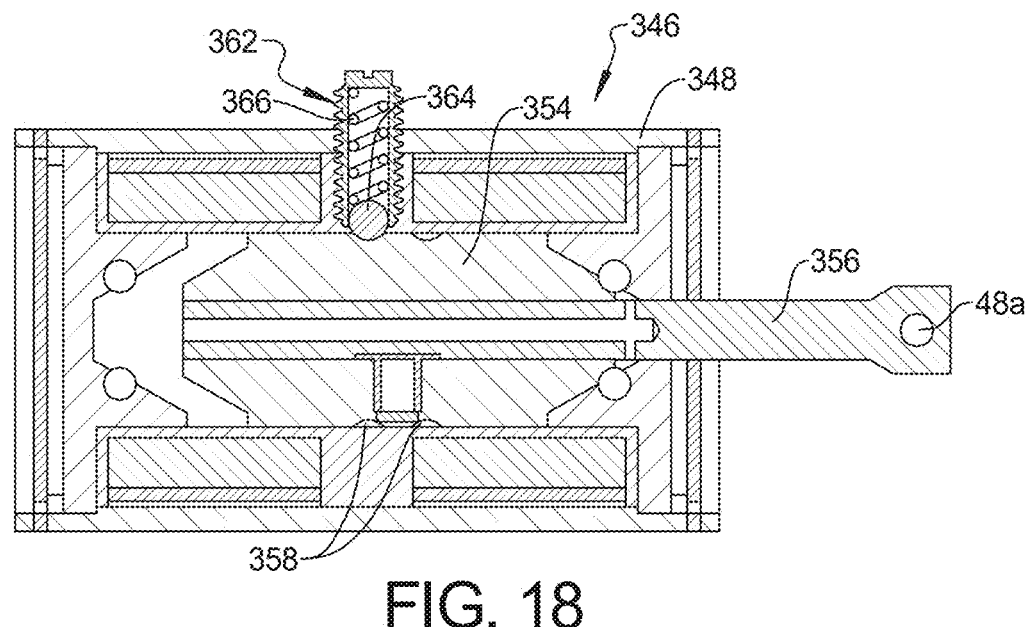
FIG. 18 is a cross sectional view of an alternative mechanically latched solenoid latched in an extended position according to the principles of the present disclosure.

In an alternative embodiment as shown in FIG. 18, the longitudinally spaced ball recesses 358 can be formed in the outer surface of the core 354 of the solenoid and the ball detent 362 can be mounted to the solenoid housing 348 so that the ball 364 of the ball detent 362 engages with either the forward or rearward recess 358 to latch the plunger 356 in either the forward or rearward direction.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle differential disconnect assembly, comprising:
a differential case;
a differential gear set carried within the differential case and including a differential carrier rotatably supported within the differential case, the differential carrier supporting a bearing pin that supports a pair of bevel gears in meshing engagement with a pair of side shaft gears;
a clutch ring including a first set of splines engaged with a second set of splines of the differential case and being movable to engage a third set of splines on the differential carrier;

10 an actuator assembly that engages a rocker that is pivotally mounted to a support structure and connected to the plunger;
a shift fork operably engaged with the clutch ring and slidably mounted for translation along an axis, the shift fork including an engagement feature for receiving an end of the rocker, wherein activation of the actuator assembly causes pivotal movement of the rocker to cause the shift fork to translate along the axis; and
a clutch ring mount connected between the shift fork and the clutch ring, wherein the clutch ring mount includes an annular ring portion with an exterior groove engaged by the shift fork, wherein the clutch ring mount includes a plurality of arms extending axially from the annular ring portion and including a groove engaging the clutch ring, wherein the plurality of arms each extend through a respective window in the differential case.

2. The vehicle differential disconnect assembly according to claim 1, wherein the first set of splines on the clutch ring that engage the second set of splines on the differential case include exterior splines and the first set of splines on the clutch ring that engage the third set of splines on the differential carrier include interior splines.

3. The vehicle differential disconnect assembly according to claim 1, wherein the actuator assembly further comprises a solenoid with a plunger.

4. The vehicle differential disconnect assembly according to claim 1, wherein the actuator assembly includes one of a bi-stable actuator assembly and a mono-stable actuator assembly.

5. A vehicle differential disconnect assembly, comprising:
a differential case;
a differential gear set carried within the differential case and including a differential carrier rotatably supported within the differential case, the differential carrier supporting a bearing pin that supports a pair of bevel gears in meshing engagement with a pair of side shaft gears;
a clutch ring including a first set of splines engaged with a second set of splines of the differential case and being movable to engage a third set of splines on the differential carrier;
an actuator assembly that engages a rocker that is pivotally mounted to a support structure and connected to the plunger; and
a shift fork operably engaged with the clutch ring and slidably mounted for translation along an axis, the shift fork including an engagement feature for receiving an end of the rocker, wherein activation of the actuator assembly causes pivotal movement of the rocker to cause the shift fork to translate along the axis, wherein the first set of splines on the clutch ring that engage second set of splines on the differential case include interior splines and the first set of splines on the clutch ring that engage the third set of splines on the differential carrier include interior splines.

6. A vehicle differential disconnect assembly, comprising:
a differential case;
a differential gear set carried within the differential case and including a differential carrier rotatably supported within the differential case, the differential carrier supporting a bearing pin that supports a pair of bevel gears in meshing engagement with a pair of side shaft gears;
a clutch ring including a first set of splines engaged with a second set of splines of the differential case and being movable to engage a third set of splines on the differential carrier;

an actuator assembly that engages a rocker that is pivotally mounted to a support structure and connected to the plunger; and a shift fork operably engaged with the clutch ring and slidably mounted for translation along an axis, the shift fork including an engagement feature for receiving an end of the rocker, wherein activation of the actuator assembly causes pivotal movement of the rocker to cause the shift fork to translate along the axis, wherein the first set of splines of the clutch ring include a plurality of stepped splines including a slider spline portion engaged with the second set of splines of the of the differential case and the plurality of stepped splines including a coupler spline portion being movable to engage the second set of splines on the second rotatable member, wherein the slider spline portion being configured to have less backlash with the first set of exterior splines than a backlash between the coupler spline portion and the second set of exterior splines.

7. A vehicle differential disconnect assembly, comprising:

a differential case;

a differential gear set carried within the differential case and including a differential carrier rotatably supported within the differential case, the differential carrier supporting a bearing pin that supports a pair of bevel gears in meshing engagement with a pair of side shaft gears;

a clutch ring including a first set of splines engaged with a second set of splines of the differential case and being movable to engage a third set of splines on the differential carrier;

an actuator assembly that engages a rocker that is pivotally mounted to a support structure and connected to the plunger; and a shift fork operably engaged with the clutch ring and slidably mounted for translation along an axis, the shift fork including an engagement feature for receiving an end of the rocker, wherein activation of the actuator assembly causes pivotal movement of the rocker to cause the shift fork to translate along the axis, wherein the actuator includes at least one electric coil, a core movable relative to the electric coil and a plunger attached to the core and to the rocker, a pair of longitudinally spaced recesses associated with one of the core and the plunger and configured to be engaged by a spring detent mechanism.

8. A clutch engagement assembly, comprising:

a first rotatable member having a first set of exterior splines;

a second rotatable member having a second set of exterior splines adjacent to the first set of exterior splines;

a clutch ring including a plurality of interior splines including a slider spline portion engaged with the first set of splines of the first rotatable member and the stepped interior splines including a coupler spline portion being movable to engage the second set of splines on the second rotatable member, wherein the slider spline portion and the coupler spline portion have different tooth thicknesses and the slider spline portion being configured to have less backlash with the first set of exterior splines than a backlash between the coupler spline portion and the second set of exterior splines; and a solenoid actuator assembly engaged with the clutch ring and operable to move the clutch ring between an engaged and a disengaged position with the second set of splines, the solenoid actuator assembly including at least one electric coil, a core movable relative to the electric coil and a plunger attached to the core and to a shift mechanism that engages the clutch ring, a pair of longitudinally spaced recesses associated with one of the core and the plunger and configured to be engaged by a spring detent mechanism.

9. The clutch engagement assembly according to claim 8, wherein the pair of longitudinally spaced recesses are disposed directly on the core.

10. The clutch engagement assembly according to claim 8, wherein the pair of longitudinally spaced recesses are disposed on a catch mounted to the plunger.

\* \* \* \* \*